US012522588B2

(12) United States Patent
Holden et al.

(10) Patent No.: US 12,522,588 B2
(45) Date of Patent: Jan. 13, 2026

(54) HERBICIDAL COMPOUNDS

(71) Applicant: SYNGENTA CROP PROTECTION AG, Basel (CH)

(72) Inventors: Catherine Mary Holden, Bracknell (GB); James Alan Morris, Bracknell (GB); Alison Jane Thompson, Bracknell (GB); Samuel Vaughan Watkin, Bracknell (GB)

(73) Assignee: SYNGENTA CROP PROTECTION AG, Basel (CH)

( * ) Notice: Subject to any disclaimer, the term of this patent is extended or adjusted under 35 U.S.C. 154(b) by 544 days.

(21) Appl. No.: 18/005,713

(22) PCT Filed: Jul. 14, 2021

(86) PCT No.: PCT/EP2021/069607
§ 371 (c)(1),
(2) Date: Jan. 17, 2023

(87) PCT Pub. No.: WO2022/013293
PCT Pub. Date: Jan. 20, 2022

(65) Prior Publication Data
US 2023/0286957 A1    Sep. 14, 2023

(30) Foreign Application Priority Data

Jul. 17, 2020 (GB) .................................. 2011068

(51) Int. Cl.
| | |
|---|---|
| C07D 403/12 | (2006.01) |
| A01N 25/32 | (2006.01) |
| A01N 43/56 | (2006.01) |
| A01N 43/58 | (2006.01) |
| A01N 43/60 | (2006.01) |
| A01P 13/00 | (2006.01) |
| C07D 401/14 | (2006.01) |
| C07D 403/14 | (2006.01) |

(52) U.S. Cl.
CPC .......... *C07D 403/12* (2013.01); *A01N 25/32* (2013.01); *A01N 43/56* (2013.01); *A01N 43/58* (2013.01); *A01N 43/60* (2013.01); *A01P 13/00* (2021.08); *C07D 401/14* (2013.01); *C07D 403/14* (2013.01)

(58) Field of Classification Search
CPC .......................... C07D 403/12; C07D 401/14
See application file for complete search history.

(56) References Cited

U.S. PATENT DOCUMENTS

| | | | |
|---|---|---|---|
| 5,759,956 | A | 6/1998 | Niedermann et al. |
| 2020/0181117 | A1 | 6/2020 | Mcleod et al. |

FOREIGN PATENT DOCUMENTS

| | | | | |
|---|---|---|---|---|
| CN | 1153779 | A | 7/1997 | |
| CN | 105037342 | A * | 11/2015 | ............. A01N 43/54 |
| CN | 105037342 | B | 11/2015 | |
| EP | 0902026 | A1 | 3/1999 | |
| EP | 1362852 | A1 | 11/2003 | |
| JP | H04145081 | A | 5/1992 | |
| WO | WO-0164669 | A1 * | 9/2001 | ................ A61P 9/12 |

OTHER PUBLICATIONS

WIPO; App. No. PCT/EP2021/069607; International Search Report and Written Opinion dated Oct. 19, 2021; pp. 1-10.

* cited by examiner

*Primary Examiner* — Andrew D Kosar
*Assistant Examiner* — John D Mcanany
(74) *Attorney, Agent, or Firm* — BakerHostetler; Toni-Junell Herbert

(57) ABSTRACT

The present disclosure relates to compounds of Formula (I), or an agronomically acceptable salt thereof, wherein Q, R1 and R2 are as defined herein. The present disclosure further relates to herbicidal compositions which comprise a compound of Formula (I) and to use of the compounds of Formula (I) for controlling weeds, in particular in crops of useful plants.

18 Claims, No Drawings

HERBICIDAL COMPOUNDS

CROSS-REFERENCE TO RELATED APPLICATIONS

This application is a 371 National Stage Application of International Application No. PCT/EP2021/069607, filed Jul. 14, 2021, which claims priority to GB 2011068.0, filed Jul. 17, 2020, the entire contents of which are incorporated by reference herein.

The present invention relates to novel herbicidal compounds, to processes for their preparation, to herbicidal compositions which comprise the novel compounds, and to their use for controlling weeds, in particular in crops of useful plants, or for inhibiting plant growth.

Herbicidal pyrazole compounds are disclosed in, for example, CN105037342. The present invention relates to novel herbicidal pyrazole compounds which show improved properties compared to the known compounds.

Thus, according to the present invention there is provided a compound of Formula (I):

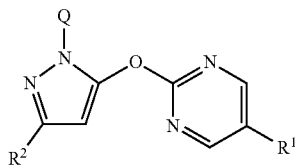
(I)

or an agronomically acceptable salt thereof, wherein

Q is phenyl or a C-linked 6-membered heteroaryl wherein said phenyl or 6-membered heteroaryl is optionally substituted by one or more $R^3$;

$R^1$ is selected from the group consisting of halogen, —CN, $NO_2$, $C_1$-$C_4$alkyl, $C_1$-$C_4$haloalkyl, $C_3$-$C_6$cycloalkyl, $C_2$-$C_4$alkenyl, $C_2$-$C_4$alkynyl, —S(O)$_p$C$_1$-$C_4$alkyl, $C_1$-$C_4$alkoxy, —C(O)C$_1$-$C_4$alkyl, —C(O)OC$_1$-$C_4$alkyl and $C_1$-$C_4$haloalkoxy;

$R^2$ is $C_1$-$C_2$haloalkyl;

$R^3$ is selected from the group consisting of halogen, $C_1$-$C_4$ alkyl, $C_1$-$C_4$ haloalkyl, $C_1$-$C_4$ alkoxy, $C_1$-$C_4$ haloalkoxy, —CN, $NO_2$, $C_2$-$C_4$alkenyl, $C_2$-$C_4$alkynyl, —S(O)$_p$C$_1$-$C_4$alkyl; and p=0, 1 or 2.

$C_1$-$C_4$alkyl- and $C_1$-$C_6$alkyl- includes, for example, methyl (Me, CH$_3$), ethyl (Et, C$_2$H$_5$), n-propyl (n-Pr), isopropyl (i-Pr), n-butyl (n-Bu), isobutyl (i-Bu), sec-butyl and tert-butyl (t-Bu). $C_1$-$C_2$alkyl is methyl (Me, CH$_3$) or ethyl (Et, C$_2$H$_5$).

$C_2$-$C_4$alkenyl- includes, for example, —CH=CH$_2$ (vinyl) and —CH$_2$—CH=CH$_2$ (allyl).

$C_2$-$C_4$alkynyl- refers to a straight or branched hydrocarbon chain radical group consisting solely of carbon and hydrogen atoms, containing at least one triple bond, having from two to four carbon atoms, and which is attached to the rest of the molecule by a single bond. Examples of $C_2$-$C_4$alkynyl include, but are not limited to, prop-1-ynyl, propargyl (prop-2-ynyl), and but-1-ynyl.

Halogen (or halo) includes, for example, fluorine, chlorine, bromine or iodine. The same correspondingly applies to halogen in the context of other definitions, such as haloalkyl.

$C_1$-$C_4$haloalkyl- includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, pentafluoroethyl, 1,1-difluoro-2,2,2-trichloroethyl, 2,2,3,3-tetrafluoropropyl and 2,2,2-trichloroethyl and heptafluoro-n-propyl. $C_1$-$C_2$haloalkyl is, for example, fluoromethyl, difluoromethyl, trifluoromethyl, chloromethyl, dichloromethyl, trichloromethyl, 2,2,2-trifluoroethyl, 2-fluoroethyl, 2-chloroethyl, pentafluoroethyl, or 1,1-difluoro-2,2,2-trichloroethyl.

$C_1$-$C_6$alkoxy includes methoxy and ethoxy.

$C_1$-$C_4$haloalkoxy- includes, for example, fluoromethoxy, difluoromethoxy, trifluoromethoxy, 2,2,2-trifluoroethoxy, 1,1,2,2-tetrafluoroethoxy, 2-fluoroethoxy, 2-chloroethoxy, 2,2-difluoroethoxy or 2,2,2-trichloroethoxy, preferably difluoromethoxy, 2-chloroethoxy or trifluoromethoxy.

$C_3$-$C_6$cycloalkyl includes cyclopropyl, cyclopentyl and cyclohexyl.

$C_1$-$C_4$alkyl-S-(alkylthio) includes, for example, methylthio, ethylthio, propylthio, isopropylthio, n-butylthio, isobutylthio, sec-butylthio or tert-butylthio, preferably methylthio or ethylthio.

$C_1$-$C_4$alkyl-S(O)-(alkylsulfinyl) includes, for example, methylsulfinyl, ethylsulfinyl, propylsulfinyl, isopropylsulfinyl, n-butylsulfinyl, isobutylsulfinyl, sec-butylsulfinyl or tert-butylsulfinyl, preferably methylsulfinyl or ethylsulfinyl.

$C_1$-$C_4$alkyl-S(O)$_2$-(alkylsulfonyl) includes, for example, methylsulfonyl, ethylsulfonyl, propylsulfonyl, isopropylsulfonyl, n-butylsulfonyl, isobutylsulfonyl, sec-butylsulfonyl or tert-butylsulfonyl, preferably methylsulfonyl or ethylsulfonyl.

In one embodiment of the present invention there is provided a compound of Formula (I) wherein Q is selected from the group consisting of:

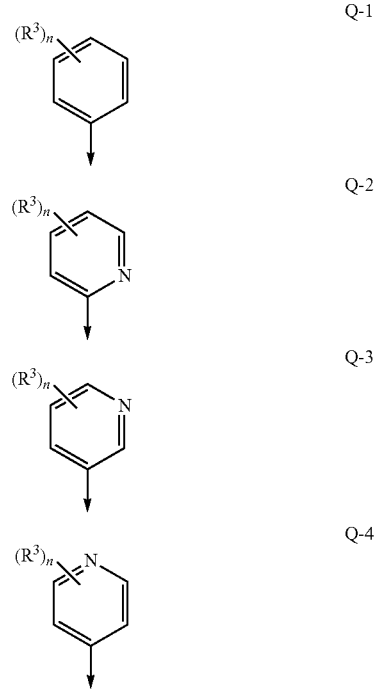

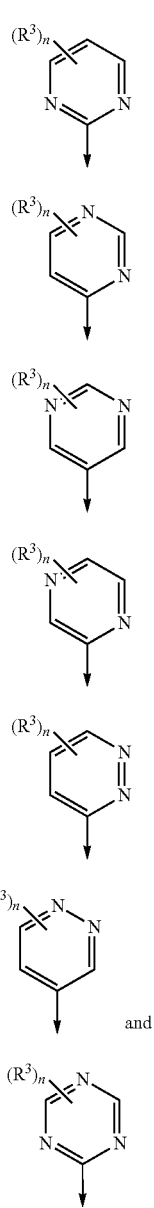

wherein n is 0, 1 or 2.

In a preferred embodiment of the present invention, Q is selected from the group consisting of Q1, Q3 and Q7.

In a preferred embodiment Q is Q1.

In another embodiment of the present invention n is 1 or 2, more preferably 1. In this embodiment each $R^3$ is preferably independently halogen (e.g chloro) or $C_1$-$C_4$ haloalkyl (e.g —$CF_3$).

In a more preferred embodiment, Q is Q1 and the $R^3$ substituent is in the 4-position. In a more preferred embodiment, Q is 4-Cl-phenyl-.

In one embodiment of the present invention, $R^1$ is halogen, more preferably chloro.

In one embodiment of the present invention, $R^2$ is —$CF_3$ or —$CF_2H$, preferably —$CF_3$.

In a preferred embodiment of the present invention $R^1$ is halogen, preferably chloro and $R^2$ is —$CF_3$ or —$CF_2H$, preferably —$CF_3$.

Compounds of Formula (I) may contain asymmetric centres and may be present as a single enantiomer, pairs of enantiomers in any proportion or, where more than one asymmetric centre are present, contain diastereoisomers in all possible ratios. Typically one of the enantiomers has enhanced biological activity compared to the other possibilities.

The present invention also provides agronomically acceptable salts of compounds of Formula (I). Salts that the compounds of Formula (I) may form with amines, including primary, secondary and tertiary amines (for example ammonia, dimethylamine and triethylamine), alkali metal and alkaline earth metal bases, transition metals or quaternary ammonium bases are preferred.

The compounds of Formula (I) according to the invention can be used as herbicides by themselves, but they are generally formulated into herbicidal compositions using formulation adjuvants, such as carriers, solvents and surface-active agents (SAA). Thus, the present invention further provides a herbicidal composition comprising a herbicidal compound according to any one of the previous claims and an agriculturally acceptable formulation adjuvant. The composition can be in the form of concentrates which are diluted prior to use, although ready-to-use compositions can also be made. The final dilution is usually made with water, but can be made instead of, or in addition to, water, with, for example, liquid fertilisers, micronutrients, biological organisms, oil or solvents.

The herbicidal compositions generally comprise from 0.1 to 99% by weight, especially from 0.1 to 95% by weight, compounds of Formula I and from 1 to 99.9% by weight of a formulation adjuvant which preferably includes from 0 to 25% by weight of a surface-active substance.

The compositions can be chosen from a number of formulation types. These include an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a soluble powder (SP), a wettable powder (WP) and a soluble granule (SG). The formulation type chosen in any instance will depend upon the particular purpose envisaged and the physical, chemical and biological properties of the compound of Formula (I).

Soluble powders (SP) may be prepared by mixing a compound of Formula (I) with one or more water-soluble inorganic salts (such as sodium bicarbonate, sodium carbonate or magnesium sulphate) or one or more water-soluble organic solids (such as a polysaccharide) and, optionally, one or more wetting agents, one or more dispersing agents or a mixture of said agents to improve water dispersibility/solubility. The mixture is then ground to a fine powder. Similar compositions may also be granulated to form water soluble granules (SG).

Wettable powders (WP) may be prepared by mixing a compound of Formula (I) with one or more solid diluents or carriers, one or more wetting agents and, preferably, one or more dispersing agents and, optionally, one or more suspending agents to facilitate the dispersion in liquids. The mixture is then ground to a fine powder. Similar compositions may also be granulated to form water dispersible granules (WG).

Granules (GR) may be formed either by granulating a mixture of a compound of Formula (I) and one or more powdered solid diluents or carriers, or from pre-formed blank granules by absorbing a compound of Formula (I) (or a solution thereof, in a suitable agent) in a porous granular material (such as pumice, attapulgite clays, fuller's earth, kieselguhr, diatomaceous earths or ground corn cobs) or by adsorbing a compound of Formula (I) (or a solution thereof, in a suitable agent) on to a hard core material (such as sands, silicates, mineral carbonates, sulphates or phosphates) and drying if necessary. Agents which are commonly used to aid absorption or adsorption include solvents (such as aliphatic and aromatic petroleum solvents, alcohols, ethers, ketones and esters) and sticking agents (such as polyvinyl acetates, polyvinyl alcohols, dextrins, sugars and vegetable oils). One or more other additives may also be included in granules (for example an emulsifying agent, wetting agent or dispersing agent).

Dispersible Concentrates (DC) may be prepared by dissolving a compound of Formula (I) in water or an organic solvent, such as a ketone, alcohol or glycol ether. These solutions may contain a surface-active agent (for example to improve water dilution or prevent crystallisation in a spray tank).

Emulsifiable concentrates (EC) or oil-in-water emulsions (EW) may be prepared by dissolving a compound of Formula (I) in an organic solvent (optionally containing one or more wetting agents, one or more emulsifying agents or a mixture of said agents). Suitable organic solvents for use in ECs include aromatic hydrocarbons (such as alkylbenzenes or alkylnaphthalenes, exemplified by SOLVESSO 100, SOLVESSO 150 and SOLVESSO 200; SOLVESSO is a Registered Trade Mark), ketones (such as cyclohexanone or methylcyclohexanone) and alcohols (such as benzyl alcohol, furfuryl alcohol or butanol), N-alkylpyrrolidones (such as N-methylpyrrolidone or N-octylpyrrolidone), dimethyl amides of fatty acids (such as $C_8$-$C_{10}$ fatty acid dimethylamide) and chlorinated hydrocarbons. An EC product may spontaneously emulsify on addition to water, to produce an emulsion with sufficient stability to allow spray application through appropriate equipment.

Preparation of an EW involves obtaining a compound of Formula (I) either as a liquid (if it is not a liquid at room temperature, it may be melted at a reasonable temperature, typically below 70° C.) or in solution (by dissolving it in an appropriate solvent) and then emulsifying the resultant liquid or solution into water containing one or more SAAs, under high shear, to produce an emulsion. Suitable solvents for use in EWs include vegetable oils, chlorinated hydrocarbons (such as chlorobenzenes), aromatic solvents (such as alkylbenzenes or alkylnaphthalenes) and other appropriate organic solvents which have a low solubility in water.

Microemulsions (ME) may be prepared by mixing water with a blend of one or more solvents with one or more SAAs, to produce spontaneously a thermodynamically stable isotropic liquid formulation. A compound of Formula (I) is present initially in either the water or the solvent/SAA blend. Suitable solvents for use in MEs include those hereinbefore described for use in in ECs or in EWs. An ME may be either an oil-in-water or a water-in-oil system (which system is present may be determined by conductivity measurements) and may be suitable for mixing water-soluble and oil-soluble pesticides in the same formulation. An ME is suitable for dilution into water, either remaining as a microemulsion or forming a conventional oil-in-water emulsion.

Suspension concentrates (SC) may comprise aqueous or non-aqueous suspensions of finely divided insoluble solid particles of a compound of Formula (I). SCs may be prepared by ball or bead milling the solid compound of Formula (I) in a suitable medium, optionally with one or more dispersing agents, to produce a fine particle suspension of the compound. One or more wetting agents may be included in the composition and a suspending agent may be included to reduce the rate at which the particles settle. Alternatively, a compound of Formula (I) may be dry milled and added to water, containing agents hereinbefore described, to produce the desired end product.

Aerosol formulations comprise a compound of Formula (I) and a suitable propellant (for example n-butane). A compound of Formula (I) may also be dissolved or dispersed in a suitable medium (for example water or a water miscible liquid, such as n-propanol) to provide compositions for use in non-pressurised, hand-actuated spray pumps.

Capsule suspensions (CS) may be prepared in a manner similar to the preparation of EW formulations but with an additional polymerisation stage such that an aqueous dispersion of oil droplets is obtained, in which each oil droplet is encapsulated by a polymeric shell and contains a compound of Formula (I) and, optionally, a carrier or diluent therefor. The polymeric shell may be produced by either an interfacial polycondensation reaction or by a coacervation procedure. The compositions may provide for controlled release of the compound of Formula (I) and they may be used for seed treatment. A compound of Formula (I) may also be formulated in a biodegradable polymeric matrix to provide a slow, controlled release of the compound.

The composition may include one or more additives to improve the biological performance of the composition, for example by improving wetting, retention or distribution on surfaces; resistance to rain on treated surfaces; or uptake or mobility of a compound of Formula (I). Such additives include surface active agents (SAAs), spray additives based on oils, for example certain mineral oils or natural plant oils (such as soy bean and rape seed oil), modified plant oils such as methylated rape seed oil (MRSO), and blends of these with other bio-enhancing adjuvants (ingredients which may aid or modify the action of a compound of Formula (I).

Wetting agents, dispersing agents and emulsifying agents may be SAAs of the cationic, anionic, amphoteric or non-ionic type.

Suitable SAAs of the cationic type include quaternary ammonium compounds (for example cetyltrimethyl ammonium bromide), imidazolines and amine salts.

Suitable anionic SAAs include alkali metals salts of fatty acids, salts of aliphatic monoesters of sulphuric acid (for example sodium lauryl sulphate), salts of sulphonated aromatic compounds (for example sodium dodecylbenzenesulphonate, calcium dodecylbenzenesulphonate, butylnaphthalene sulphonate and mixtures of sodium di-isopropyl- and tri-isopropyl-naphthalene sulphonates), ether sulphates, alcohol ether sulphates (for example sodium laureth-3-sulphate), ether carboxylates (for example sodium laureth-3-carboxylate), phosphate esters (products from the reaction between one or more fatty alcohols and phosphoric acid (predominately mono-esters) or phosphorus pentoxide (predominately di-esters), for example the reaction between lauryl alcohol and tetraphosphoric acid; additionally these products may be ethoxylated), sulphosuccinamates, paraffin or olefine sulphonates, taurates, lignosulphonates and phosphates/sulphates of tristyrylphenols.

Suitable SAAs of the amphoteric type include betaines, propionates and glycinates.

Suitable SAAs of the non-ionic type include condensation products of alkylene oxides, such as ethylene oxide, propylene oxide, butylene oxide or mixtures thereof, with fatty alcohols (such as oleyl alcohol or cetyl alcohol) or with alkylphenols (such as octylphenol, nonylphenol or octylcresol); partial esters derived from long chain fatty acids or hexitol anhydrides; condensation products of said partial esters with ethylene oxide; block polymers (comprising ethylene oxide and propylene oxide); alkanolamides; simple esters (for example fatty acid polyethylene glycol esters); amine oxides (for example lauryl dimethyl amine oxide); lecithins and sorbitans and esters thereof, alkyl polyglycosides and tristyrylphenols.

Suitable suspending agents include hydrophilic colloids (such as polysaccharides, polyvinylpyrrolidone or sodium carboxymethylcellulose) and swelling clays (such as bentonite or attapulgite).

The compounds of present invention can also be used in mixture with one or more additional herbicides and/or plant growth regulators. Examples of such additional herbicides or plant growth regulators include acetochlor, acifluorfen (including acifluorfen-sodium), aclonifen, ametryn, amicarbazone, aminopyralid, aminotriazole, atrazine, beflubutamid-M, benquitrione, bensulfuron (including bensulfuron-methyl), bentazone, bicyclopyrone, bilanafos, bispyribac-sodium, bixlozone, bromacil, bromoxynil, butachlor, butafenacil, carfentrazone (including carfentrazone-ethyl), cloransulam (including cloransulam-methyl), chlorimuron (including chlorimuron-ethyl), chlorotoluron, chlorsulfuron, cinmethylin, clacyfos, clethodim, clodinafop (including clodinafop-propargyl), clomazone, clopyralid, cyclopyranil, cyclopyrimorate, cyclosulfamuron, cyhalofop (including cyhalofop-butyl), 2,4-D (including the choline salt and 2-ethylhexyl ester thereof), 2,4-DB, desmedipham, dicamba (including the aluminium, aminopropyl, bis-aminopropylmethyl, choline, dichloroprop, diglycolamine, dimethylamine, dimethylammonium, potassium and sodium salts thereof) diclosulam, diflufenican, diflufenzopyr, dimethachlor, dimethenamid-P, diquat dibromide, diuron, epyrifenacil, ethalfluralin, ethofumesate, fenoxaprop (including fenoxaprop-P-ethyl), fenoxasulfone, fenquinotrione, fentrazamide, flazasulfuron, florasulam, florpyrauxifen (including florpyrauxifen-benzyl), fluazifop (including fluazifop-P-butyl), flucarbazone (including flucarbazone-sodium), flufenacet, flumetsulam, flumioxazin, fluometuron, flupyrsulfuron (including flupyrsulfuron-methyl-sodium), fluroxypyr (including fluroxypyr-meptyl), fomesafen, foramsulfuron, glufosinate (including L-glufosinate and the ammonium salts of both), glyphosate (including the diammonium, isopropylammonium and potassium salts thereof), halauxifen (including halauxifen-methyl), haloxyfop (including haloxyfop-methyl), hexazinone, hydantocidin, imazamox, imazapic, imazapyr, imazethapyr, indaziflam, iodosulfuron (including iodosulfuron-methyl-sodium), iofensulfuron (including iofensulfuron-sodium), ioxynil, isoproturon, isoxaflutole, lancotrione, MCPA, MCPB, mecoprop-P, mesosulfuron (including mesosulfuron-methyl), mesotrione, metamitron, metazachlor, methiozolin, metolachlor, metosulam, metribuzin, metsulfuron, napropamide, nicosulfuron, norflurazon, oxadiazon, oxasulfuron, oxyfluorfen, paraquat dichloride, pendimethalin, penoxsulam, phenmedipham, picloram, pinoxaden, pretilachlor, primisulfuron-methyl, prometryne, propanil, propaquizafop, propyrisulfuron, propyzamide, prosulfocarb, prosulfuron, pyraclonil, pyraflufen (including pyraflufen-ethyl), pyrasulfotole, pyridate, pyriftalid, pyrimisulfan, pyroxasulfone, pyroxsulam, quinclorac, quinmerac, quizalofop (including quizalofop-P-ethyl and quizalofop-P-tefuryl), rimsulfuron, saflufenacil, sethoxydim, simazine, S-metalochlor, sulfentrazone, sulfosulfuron, tebuthiuron, tefuryltrione, tembotrione, terbuthylazine, terbutryn, tetflupyrolimet, thiencarbazone, thifensulfuron, tiafenacil, tolpyralate, topramezone, tralkoxydim, triafamone, triallate, triasulfuron, tribenuron (including tribenuron-methyl), triclopyr, trifloxysulfuron (including trifloxysulfuron-sodium), trifludimoxazin, trifluralin, triflusulfuron, 3-(2-chloro-4-fluoro-5-(3-methyl-2,6-dioxo-4-trifluoromethyl-3,6-dihydropyrimidin-1(2H)-yl)phenyl)-5-methyl-4,5-dihydroisoxazole-5-carboxylic acid ethyl ester, 4-hydroxy-1-methoxy-5-methyl-3-[4-(trifluoromethyl)-2-pyridyl]imidazolidin-2-one, 4-hydroxy-1,5-dimethyl-3-[4-(trifluoromethyl)-2-pyridyl]imidazolidin-2-one, 5-ethoxy-4-hydroxy-1-methyl-3-[4-(trifluoromethyl)-2-pyridyl]imidazolidin-2-one, 4-hydroxy-1-methyl-3-[4-(trifluoromethyl)-2-pyridyl]imidazolidin-2-one, 4-hydroxy-1,5-dimethyl-3-[1-methyl-5-(trifluoromethyl)pyrazol-3-yl]imidazolidin-2-one, (4R)1-(5-tert-butylisoxazol-3-yl)-4-ethoxy-5-hydroxy-3-methyl-imidazolidin-2-one, 3-[2-(3,4-dimethoxyphenyl)-6-methyl-3-oxo-pyridazine-4-carbonyl]bicyclo[3.2.1]octane-2,4-dione, 2-[2-(3,4-dimethoxyphenyl)-6-methyl-3-oxo-pyridazine-4-carbonyl]-5-methyl-cyclohexane-1,3-dione, 2-[2-(3,4-dimethoxyphenyl)-6-methyl-3-oxo-pyridazine-4-carbonyl]cyclohexane-1,3-dione, 2-[2-(3,4-dimethoxyphenyl)-6-methyl-3-oxo-pyridazine-4-carbonyl]-5,5-dimethyl-cyclohexane-1,3-dione, 6-[2-(3,4-dimethoxyphenyl)-6-methyl-3-oxo-pyridazine-4-carbonyl]-2,2,4,4-tetramethyl-cyclohexane-1,3,5-trione, 2-[2-(3,4-dimethoxyphenyl)-6-methyl-3-oxo-pyridazine-4-carbonyl]-5-ethyl-cyclohexane-1,3-dione, 2-[2-(3,4-dimethoxyphenyl)-6-methyl-3-oxo-pyridazine-4-carbonyl]-4,4,6,6-tetramethyl-cyclohexane-1,3-dione, 2-[6-cyclopropyl-2-(3,4-dimethoxyphenyl)-3-oxo-pyridazine-4-carbonyl]-5-methyl-cyclohexane-1,3-dione, 3-[6-cyclopropyl-2-(3,4-dimethoxyphenyl)-3-oxo-pyridazine-4-carbonyl]bicyclo[3.2.1]octane-2,4-dione, 2-[6-cyclopropyl-2-(3,4-dimethoxyphenyl)-3-oxo-pyridazine-4-carbonyl]-5,5-dimethyl-cyclohexane-1,3-dione, 6-[6-cyclopropyl-2-(3,4-dimethoxyphenyl)-3-oxo-pyridazine-4-carbonyl]-2,2,4,4-tetramethyl-cyclohexane-1,3,5-trione, 2-[6-cyclopropyl-2-(3,4-dimethoxyphenyl)-3-oxo-pyridazine-4-carbonyl]cyclohexane-1,3-dione, 4-[2-(3,4-dimethoxyphenyl)-6-methyl-3-oxo-pyridazine-4-carbonyl]-2,2,6,6-tetramethyl-tetrahydropyran-3,5-dione, 4-[6-cyclopropyl-2-(3,4-dimethoxyphenyl)-3-oxo-pyridazine-4-carbonyl]-2,2,6,6-tetramethyl-tetrahydropyran-3,5-dione, 4-amino-3-chloro-5-fluoro-6-(7-fluoro-1H-indol-6-yl)pyridine-2-carboxylic acid (including agrochemically acceptable esters thereof, for example, methyl 4-amino-3-chloro-5-fluoro-6-(7-fluoro-1H-indol-6-yl)pyridine-2-carboxylate, prop-2-ynyl 4-amino-3-chloro-5-fluoro-6-(7-fluoro-1H-indol-6-yl)pyridine-2-carboxylate and cyanomethyl 4-amino-3-chloro-5-fluoro-6-(7-fluoro-1H-indol-6-yl)pyridine-2-carboxylate), 3-ethylsulfanyl-N-(1,3,4-oxadiazol-2-yl)-5-(trifluoromethyl)-[1,2,4]triazolo[4,3-a]pyridine-8-carboxamide, 3-(isopropylsulfanylmethyl)-N-(5-methyl-1,3,4-oxadiazol-2-yl)-5-(trifluoromethyl)-[1,2,4]triazolo[4,3-a]pyridine-8-carboxamide, 3-(isopropylsulfonylmethyl)-N-(5-methyl-1,3,4-oxadiazol-2-yl)-5-(trifluoromethyl)-[1,2,4]triazolo[4,3-a]pyridine-8-carboxamide, 3-(ethylsulfonylmethyl)-N-(5-methyl-1,3,4-oxadiazol-2-yl)-5-(trifluoromethyl)-[1,2,4]triazolo[4,3-a]pyridine-8-carboxamide, ethyl 2-[[3-[[3-chloro-5-fluoro-6-[3-methyl-2,6-dioxo-4-(trifluoromethyl)pyrimidin-1-yl]-2-pyridyl]oxy]acetate, 6-chloro-4-(2,7-dimethyl-1-naphthyl)-5-hydroxy-2-methyl-pyridazin-3-one, 1-[2-chloro-6-(5-chloropyrimidin-2-yl)oxy-phenyl]-4,4,4-trifluoro-butan-1-one and 5-[2-chloro-6-(5-chloropyrimidin-2-yl)oxy-phenyl]-3-(difluoromethyl)isoxazole.

The mixing partners of the compound of Formula (I) may also be in the form of esters or salts, as mentioned e.g. in The Pesticide Manual, Sixteenth Edition, British Crop Protection Council, 2012.

The compound of Formula (I) can also be used in mixtures with other agrochemicals such as fungicides, nematicides or insecticides, examples of which are given in The Pesticide Manual.

The mixing ratio of the compound of Formula (I) to the mixing partner is preferably from 1:100 to 1000:1.

The mixtures can advantageously be used in the above-mentioned formulations (in which case "active ingredient" relates to the respective mixture of compound of Formula (I) with the mixing partner).

The compounds or mixtures of the present invention can also be used in combination with one or more herbicide safeners. Examples of such safeners include benoxacor, cloquintocet (including cloquintocet-mexyl), cyprosulfamide, dichlormid, fenchlorazole (including fenchlorazole-ethyl), fenclorim, fluxofenim, furilazole, isoxadifen (including isoxadifen-ethyl), mefenpyr (including mefenpyr-diethyl), metcamifen and oxabetrinil.

Particularly preferred are mixtures of a compound of Formula (I) with cyprosulfamide, isoxadifen-ethyl, cloquintocet-mexyl and/or metcamifen.

The safeners of the compound of Formula (I) may also be in the form of esters or salts, as mentioned e.g. in The Pesticide Manual, 16$^{th}$ Edition (BCPC), 2012. The reference to cloquintocet-mexyl also applies to a lithium, sodium, potassium, calcium, magnesium, aluminium, iron, ammonium, quaternary ammonium, sulfonium or phosphonium salt thereof as disclosed in WO 02/34048.

Preferably the mixing ratio of compound of Formula (I) to safener is from 100:1 to 1:10, especially from 20:1 to 1:1.

The present invention still further provides a method of controlling weeds at a locus said method comprising application to the locus of a weed controlling amount of a composition comprising a compound of Formula (I). Moreover, the present invention may further provide a method of selectively controlling weeds at a locus comprising crop plants and weeds, wherein the method comprises application to the locus of a weed controlling amount of a composition according to the present invention. 'Controlling' means killing, reducing or retarding growth or preventing or reducing germination. It is noted that the compounds of the present invention show a much-improved selectivity compared to know, structurally similar compounds. Generally the plants to be controlled are unwanted plants (weeds). 'Locus' means the area in which the plants are growing or will grow. The application may be applied to the locus pre-emergence and/or postemergence of the crop plant. Some crop plants may be inherently tolerant to herbicidal effects of compounds of Formula (I). Preferred crop plants include maize, wheat, barley soybean and rice.

The rates of application of compounds of Formula I may vary within wide limits and depend on the nature of the soil, the method of application (pre- or post-emergence; seed dressing; application to the seed furrow; no tillage application etc.), the crop plant, the weed(s) to be controlled, the prevailing climatic conditions, and other factors governed by the method of application, the time of application and the target crop. The compounds of Formula I according to the invention are generally applied at a rate of from 10 to 2500 g/ha, especially from 25 to 1000 g/ha, more especially from 25 to 250 g/ha.

The application is generally made by spraying the composition, typically by tractor mounted sprayer for large areas, but other methods such as dusting (for powders), drip or drench can also be used.

Crop plants are to be understood as also including those crop plants which have been rendered tolerant to other herbicides or classes of herbicides (e.g. ALS-, GS-, EPSPS-, PPO-, HPPD-, -PDS and ACCase-inhibitors) by conventional methods of breeding or by genetic engineering. An example of a crop that has been rendered tolerant to imidazolinones, e.g. imazamox, by conventional methods of breeding is Clearfield® summer rape (canola). Examples of crops that have been rendered tolerant to herbicides by genetic engineering methods include e.g. glyphosate- and glufosinate-resistant maize varieties commercially available under the trade names RoundupReady® and LibertyLink®. The compounds of the present invention can also be used in conjunction with crops that are tolerant to SDPS-inhibiting herbicides, such as those taught in WO2020/236790.

Crop plants are also to be understood as being those which have been rendered resistant to harmful insects by genetic engineering methods, for example Bt maize (resistant to European corn borer), Bt cotton (resistant to cotton boll weevil) and also Bt potatoes (resistant to Colorado beetle). Examples of Bt maize are the Bt 176 maize hybrids of NK® (Syngenta Seeds). The Bt toxin is a protein that is formed naturally by *Bacillus thuringiensis* soil bacteria. Examples of toxins, or transgenic plants able to synthesise such toxins, are described in EP-A-451 878, EP-A-374 753, WO 93/07278, WO 95/34656, WO 03/052073 and EP-A-427 529. Examples of transgenic plants comprising one or more genes that code for an insecticidal resistance and express one or more toxins are KnockOut® (maize), Yield Gard® (maize), NuCOTIN33B® (cotton), Bollgard® (cotton), NewLeaf® (potatoes), NatureGard® and Protexcta®. Plant crops or seed material thereof can be both resistant to herbicides and, at the same time, resistant to insect feeding ("stacked" transgenic events). For example, seed can have the ability to express an insecticidal Cry3 protein while at the same time being tolerant to glyphosate.

Crop plants are also to be understood to include those which are obtained by conventional methods of breeding or genetic engineering and contain so-called output traits (e.g. improved storage stability, higher nutritional value and improved flavour).

The compositions can be used to control unwanted plants (collectively, 'weeds'). The weeds to be controlled may be both monocotyledonous species, for example *Agrostis, Alopecurus, Avena, Brachiaria, Bromus, Cenchrus, Cyperus, Digitaria, Echinochloa, Eleusine, Lolium, Monochoria, Rottboellia, Sagittaria, Scirpus, Setaria* and *Sorghum*, and dicotyledonous species, for example *Abutilon, Amaranthus, Ambrosia, Chenopodium, Chrysanthemum, Conyza, Galium, Ipomoea, Nasturtium, Sida, Sinapis, Solanum, Stellaria, Veronica, Viola* and *Xanthium*.

In a further aspect of the present invention there is provided the use of a compound of Formula (I) as defined herein as a herbicide.

Processes for Preparation of Compounds of Formula (I)

Processes for preparation of compounds, e.g. a compound of formula (I) (which optionally can be an agrochemically acceptable salt thereof), are now described, and form further aspects of the present invention.

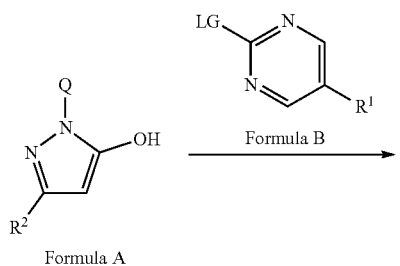

Formula A

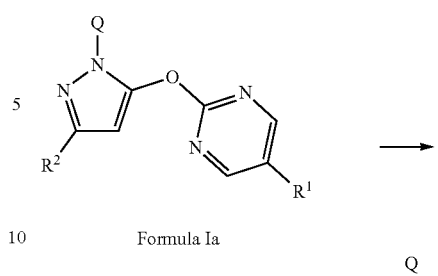

Formula B

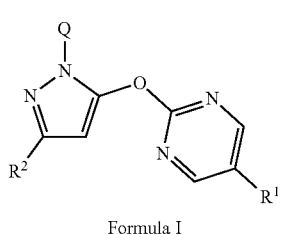

Formula I

A compound of Formula I may be prepared from a compound of Formula A by reaction with a compound of Formula B (where LG represents a suitable leaving group such as F, Cl, Br or $SO_2Me$) in the presence of a suitable base and in a suitable solvent. Suitable bases may include $K_2CO_3$, $Cs_2CO_3$ or NaH. Suitable solvents may include DMF, NMP or $CH_3CN$. Compounds of Formula B are commercially available or may be prepared by methods known in the literature.

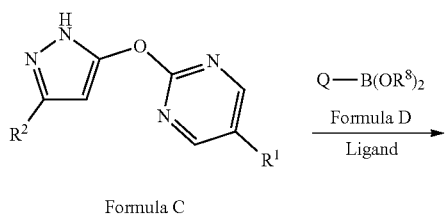

Formula C

Formula I

In an alternative approach, a compound of Formula I may be prepared from a compound of Formula C via a Chan-Lam cross-coupling coupling reaction with a compound of Formula D (where $R^B$ represents H, methyl or tetramethylethylene) in the presence of a suitable catalyst/ligand and in a suitable solvent. Suitable catalysts may include $Cu(OAc)_2$. Suitable ligands may include 1,10-phenanthroline. Suitable solvents may include $CH_3CN$.

Formula Ia

Formula Ib

A compound of Formula Ib (Formula 1 where $R^1$ is methyl) may be prepared from a compound of Formula Ia (Formula 1 where $R^1$ is Br) via a Suzuki cross-coupling coupling reaction with a suitable methylating reagent in the presence of a suitable catalyst/ligand, a suitable base and in a suitable solvent. Suitable methylating reagents may include trimethyl boroxine. Suitable catalysts may include $Pd(OAc)_2$. Suitable ligands may include X-Phos. Suitable bases may include potassium carbonate. Suitable solvents may include 2Me-THF.

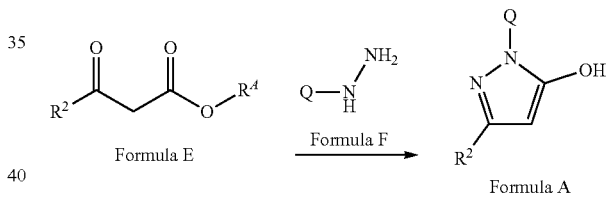

Formula E    Formula F    Formula A

A compound of Formula A may be prepared from a compound of Formula F by a condensation reaction with a compound of Formula E (where $R^A$ represents methyl or ethyl) in a suitable solvent. Suitable solvents may include acetic acid. Compounds of Formula C and of Formula D are commercially available or may be prepared by methods known in the literature.

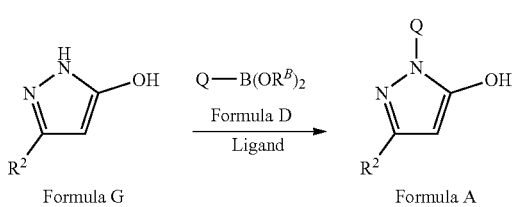

Formula G    Formula A

In an alternative approach, a compound of Formula A may be prepared from a compound of Formula G via a Chan-Lam cross-coupling coupling reaction with a compound of Formula D (where $R^B$ represents H, methyl or tetramethylethylene) in the presence of a suitable catalyst/ligand and in a suitable solvent. Suitable catalysts may include $Cu(OAc)_2$. Suitable ligands may include 1,10-phenanthroline. Suitable

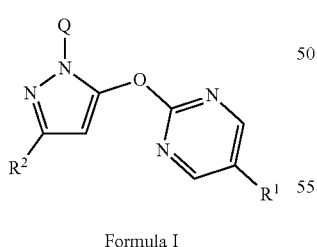

solvents may include CH₃CN. Compounds of Formula D and of Formula G are commercially available or may be prepared by methods known in the literature.

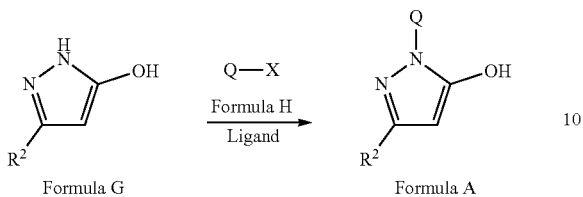

In a yet further alternative approach, a compound of Formula A may be prepared from a compound of Formula E via an Ullmann cross-coupling coupling reaction with a compound of Formula G (where X represents a suitable halogen such as I, Br or Cl) in the presence of a suitable catalyst/ligand and in a suitable solvent. Suitable catalysts may include CuI. Suitable ligands may include 1,10-phenanthroline. Suitable solvents may include DMSO. Compounds of Formula H and of Formula G are commercially available or may be prepared by methods known in the literature.

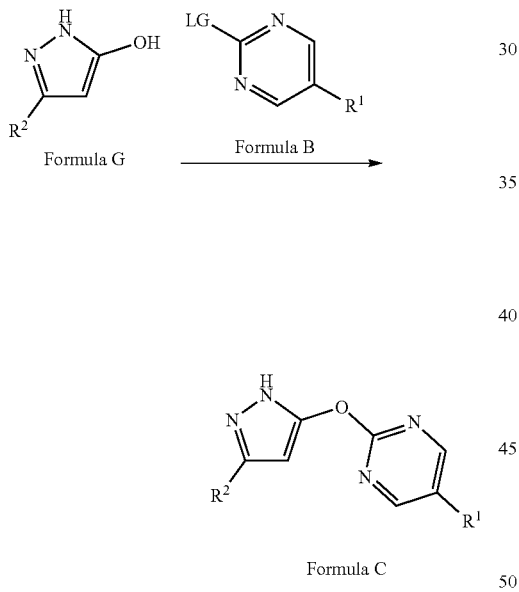

A compound of Formula C may be prepared from a compound of Formula G by reaction with a compound of Formula B (where LG represents a suitable leaving group such as F, Cl, Br or SO₂Me) in the presence of a suitable base and in a suitable solvent. Suitable bases may include K₂CO₃, Cs₂CO₃ or NaH. Suitable solvents may include DMF, NMP or CH₃CN.

The following non-limiting examples provide specific synthesis methods for representative compounds of the present invention, as referred to in Table 1 below.

EXAMPLE 1: SYNTHESIS OF 5-CHLORO-2-[5-(TRIFLUOROMETHYL)-2-[4-(TRIFLUOROMETHYL) PHENYL]PYRAZOL-3-YL]OXY-PYRIMIDINE (COMPOUND 1.001)

Step 1: Synthesis of 5-(trifluoromethyl)-2-[4-(trifluoromethyl)phenyl]pyrazol-3-ol

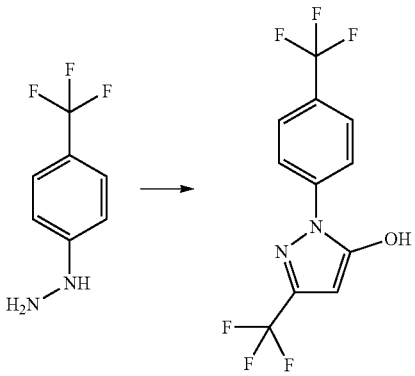 [SMILES: NNc1ccc(C(F)(F)F)cc1 ; Oc1cc(C(F)(F)F)nn1-c1ccc(C(F)(F)F)cc1]

A solution of methyl-4,4,4-trifluoro-3-oxo-butanoate (1.50 g, 8.82 mmol), 4-trifluoromethylphenylhydrazine (1.71 g, 9.70 mmol) in acetic acid (8.9 mL) was heated at reflux for 4 hours then allowed to cool to RT. The reaction was poured into saturated aqueous sodium bicarbonate solution (75 mL) and extracted with EtOAc (2×75 ml). The combined organic extracts were evaporated to dryness under reduced pressure and the crude product purified by flash chromatography on silica gel using 20% EtOAc/cyclohexane as eluent to give the desired product (1.88 g, 72%) as a white solid.

Step 2: Synthesis of 5-chloro-2-[5-(trifluoromethyl)-2-[4-(trifluoromethyl)phenyl]pyrazol-3-yl]oxy-pyrimidine (Compound 1.001)

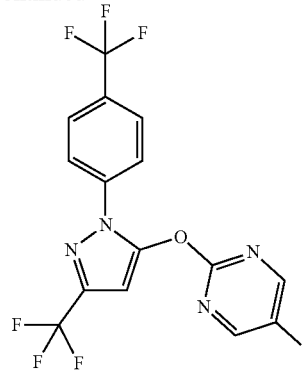

To a solution of 5-(trifluoromethyl)-2-[4-(trifluoromethyl)phenyl]pyrazol-3-ol (300 mg, 1.0 mmol) in DMF (9 mL) at 0° C. under an atmosphere of $N_2$ was added NaH (0.061 g of a 60% dispersion in mineral oil, 1.5 mmol). The reaction was stirred at 0° C. for 20 minutes and then 1,5-dichloropyrimidine (300 mg, 2.0 mmol) was added. The reaction was allowed to warm to RT overnight and then heated at 60° C. for 18 hours. The reaction was allowed to cool to RT, diluted with saturated aqueous $NH_4Cl$ solution and extracted with EtOAc (2×25 mL). The combined organic extracts were washed with brine and evaporated to dryness under reduced pressure. The crude product was purified by mass-directed reverse phase HPLC to give the desired product (115 mg, 28%).

$^1$H NMR (400 MHz, $CDCl_3$) δ 8.54 (s, 2H), 7.87 (d, 2H), 7.74 (d, 2H), 6.65 (s, 1H)

EXAMPLE 2: SYNTHESIS OF 5-CHLORO-2-[2-(2-METHYLPYRIMIDIN-5-YL)-5-(TRIFLUOROMETHYL)PYRAZOL-3-YL]OXY-PYRIMIDINE (COMPOUND 1.022)

Step 1: Synthesis of 5-chloro-2-[[3-(trifluoromethyl)-1H-pyrazol-5-yl]oxy]pyrimidine

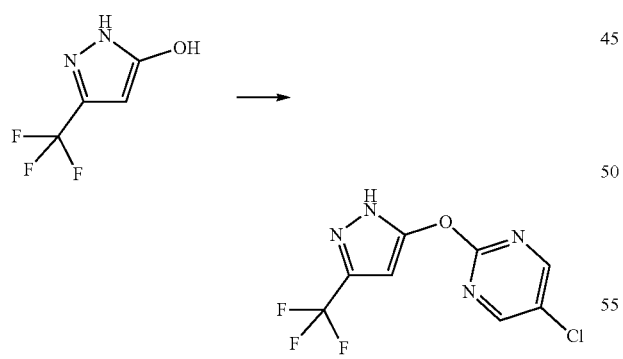

To a suspension of 3-(trifluoromethyl)-1H-pyrazol-5-ol (4.08 g, 26.8 mmol) and potassium carbonate (3.79 g, 26.8 mmol) in sulfolane (15 mL) and cyclopentylmethyl ether (5 mL) was added 2,5-dichloropyrimidine (1.00 g, 6.71 mmol) at RT. The reaction was stirred at 110° C. under $N_2$ for 2 h. The reaction was allowed to cool to RT and diluted with water (50 mL) and TBME (50 mL). The phases were separated and the aqueous phase extracted with TBME (3×25 mL). The organic extracts were washed with brine and evaporated to dryness under reduced pressure. The crude product was purified by flash chromatography on silica gel using a gradient of 0-50% EtOAc/cyclohexane as eluent to give the desired product (1.09 g, 61%) as a white solid.

$^1$H NMR (400 MHz, $CDCl_3$) δ 10.78 (brs, 1H), 8.60 (s, 2H), 6.49 (s, 1H)

Step 2: Synthesis of 5-chloro-2-[2-(2-methylpyrimidin-5-yl)-5-(trifluoromethyl)pyrazol-3-yl]oxy-pyrimidine (Compound 1.022)

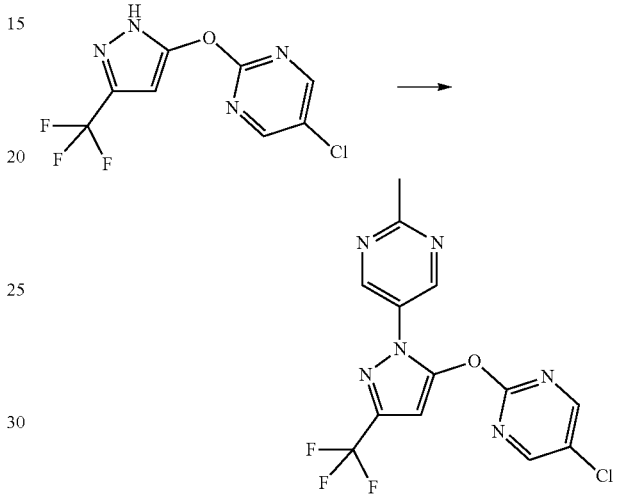

To a suspension of 5-chloro-2-[[3-(trifluoromethyl)-1H-pyrazol-5-yl]oxy]pyrimidine (0.200 g, 0.76 mmol), (2-methylpyrimidin-5-yl)boronic acid (0.261 g, 1.89 mmol) and $Cu(OAc)_2$ (0.220 g, 1.21 mmol) in dichloromethane (5 mL) at RT under air was added pyridine (0.12 mL, 1.51 mmol). The reaction was stirred at RT for 16 h. The reaction was concentrated onto granular celite and the crude product purified by flash chromatography on silica gel using a gradient of 0-40% EtOAc/cyclohexane as eluent to give the desired product (0.154 g, 57%) as a white solid.

$^1$H NMR (400 MHz, $CDCl_3$) δ 9.01 (s, 2H), 8.56 (s, 2H), 6.70 (s, 1H), 2.80 (s, 3H)

EXAMPLE 3: 4-[5-(5-CHLOROPYRIMIDIN-2-YL)OXY-3-(TRIFLUOROMETHYL)PYRAZOL-1-YL]-2-(TRIFLUOROMETHYL)PYRIMIDINE (COMPOUND 1.023)

Step 1: Synthesis of 4-[5-(5-chloropyrimidin-2-yl)oxy-3-(trifluoromethyl)pyrazol-1-yl]-2-(trifluoromethyl)pyrimidine (Compound 1.023)

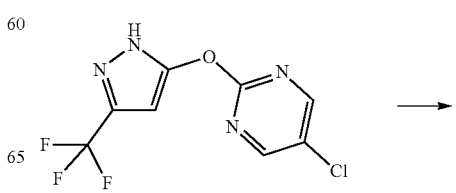

17

-continued

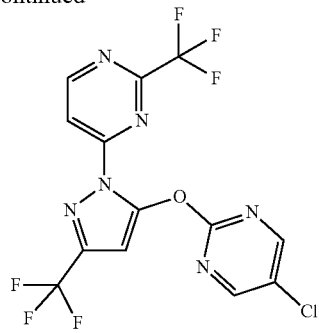

To a suspension of 5-chloro-2-[[3-(trifluoromethyl)-1H-pyrazol-5-yl]oxy]pyrimidine (0.05 g, 0.19 mmol) and cesium carbonate (0.080 g, 0.25 mmol) in acetonitrile (1 mL) was added 4-chloro-2-(trifluoromethyl)pyrimidine (0.043 g, 0.029 mL, 0.24 mmol) under $N_2$ at RT. The reaction was stirred at RT under $N_2$ for 22 h. The reaction was concentrated onto granular celite and the crude product purified by flash chromatography on silica gel using a gradient of 0-50% EtOAc/cyclohexane as eluent to give the desired product (0.051 g, 66%) as a colourless oil.

$^1$H NMR (400 MHz, CDCl$_3$) δ 8.94 (d, 1H), 8.50 (s, 2H), 8.14 (d, 1H), 6.58 (s, 1H)

EXAMPLE 4: 5-METHYL-2-[5-(TRIFLUOROMETHYL)-2-[4-(TRIFLUOROMETHYL)PHENYL]PYRAZOL-3-YL]OXY-PYRIMIDINE (COMPOUND 1.020)

Step 1: Synthesis of 5-bromo-2-[5-(trifluoromethyl)-2-[4-(trifluoromethyl)phenyl]pyrazol-3-yl]oxy-pyrimidine (Compound 1.036)

18

To a suspension of 5-(trifluoromethyl)-2-[4-(trifluoromethyl)phenyl]pyrazol-3-ol (1.00 g, 3.38 mmol), and potassium carbonate (1.43 g, 10.1 mmol) in sulfolane (15.0 mL) at 50° C. under $N_2$ was added 5-bromo-2-chloro-pyrimidine (0.784 g, 4.05 mmol) and the reaction mixture heated to 140° C. under $N_2$ for 2 h. Further 5-bromo-2-chloro-pyrimidine (0.196 g, 1.01 mmol) was added and the reaction heated at 140° C. under $N_2$ for a further 2 h. The reaction was allowed to cool to RT and diluted with water (50 mL) and TBME (20 mL). The aqueous phase was further extracted with TBME (4×20 mL). The combined extracts were washed with brine and then concentrated onto granulated celite. The crude product was purified by flash chromatography on silica gel using a gradient of 0-40% EtOAc/cyclohexane as eluent to give the desired product (0.645 g, 42%) as a yellow oil.

$^1$H NMR (400 MHz, CDCl$_3$) δ 8.62 (s, 2H), 7.87 (d, 2H), 7.72 (d, 2H), 6.65 (s, 1H)

Step 2: Synthesis of 5-methyl-2-[5-(trifluoromethyl)-2-[4-(trifluoromethyl) phenyl]pyrazol-3-yl]oxy-pyrimidine (Compound 1.020)

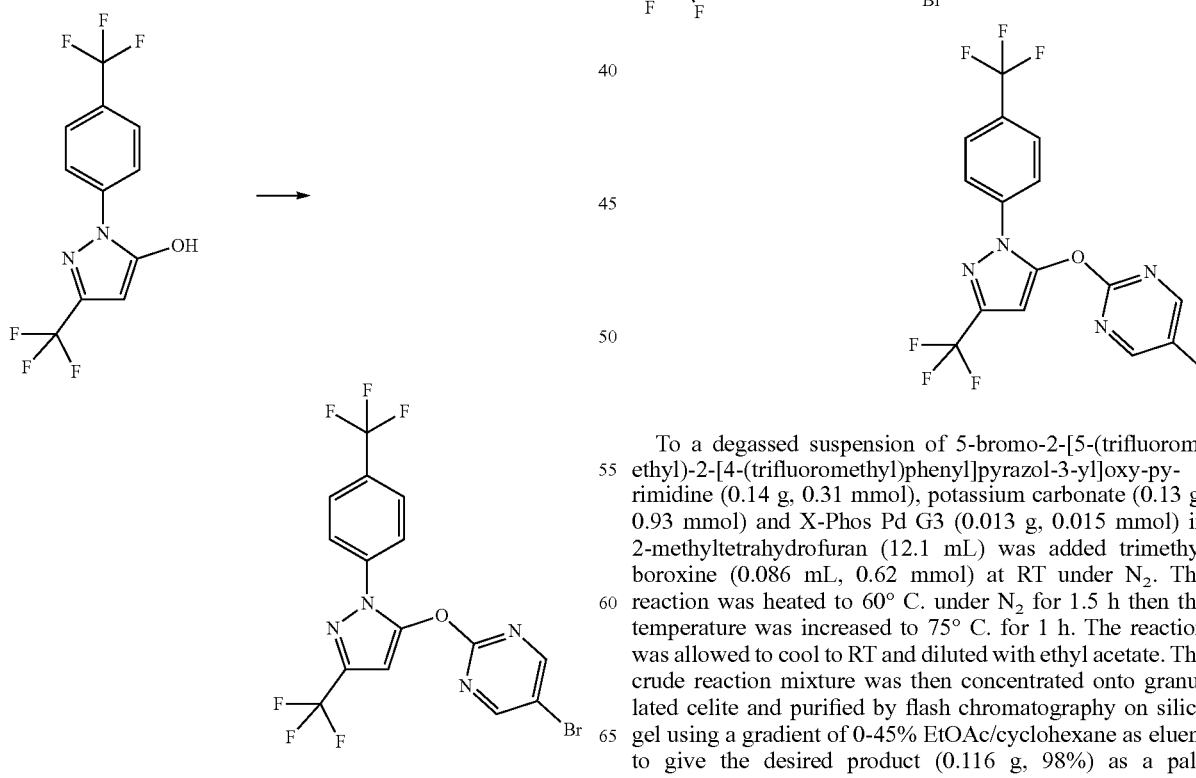

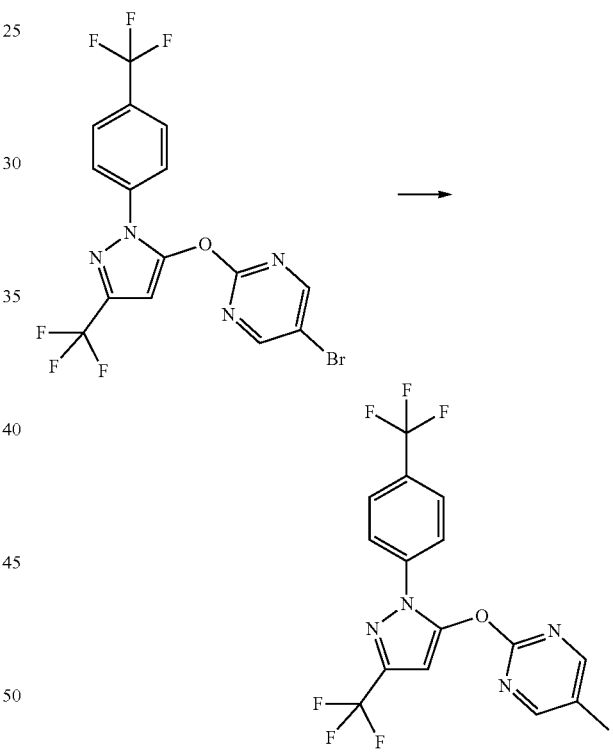

To a degassed suspension of 5-bromo-2-[5-(trifluoromethyl)-2-[4-(trifluoromethyl)phenyl]pyrazol-3-yl]oxy-pyrimidine (0.14 g, 0.31 mmol), potassium carbonate (0.13 g, 0.93 mmol) and X-Phos Pd G3 (0.013 g, 0.015 mmol) in 2-methyltetrahydrofuran (12.1 mL) was added trimethyl boroxine (0.086 mL, 0.62 mmol) at RT under $N_2$. The reaction was heated to 60° C. under $N_2$ for 1.5 h then the temperature was increased to 75° C. for 1 h. The reaction was allowed to cool to RT and diluted with ethyl acetate. The crude reaction mixture was then concentrated onto granulated celite and purified by flash chromatography on silica gel using a gradient of 0-45% EtOAc/cyclohexane as eluent to give the desired product (0.116 g, 98%) as a pale yellow/brown oil.

$^1$H NMR (400 MHz, CDCl$_3$) δ 8.41 (d, 2H), 7.90 (d, 2H), 7.71 (s, 2H), 6.64 (s, 1H), 2.30 (s, 3H)

EXAMPLE 5: 5-CHLORO-2-[5-(TRIFLUOROMETHYL)-2-[5-(TRIFLUOROMETHYL)-2-PYRIDYL]PYRAZOL-3-YL]OXY-PYRIMIDINE (COMPOUND 1.019)

Step 1: Synthesis of 5-chloro-2-[5-(trifluoromethyl)-2-[5-(trifluoromethyl)-2-pyridyl]pyrazol-3-yl]oxy-pyrimidine (Compound 1.019)

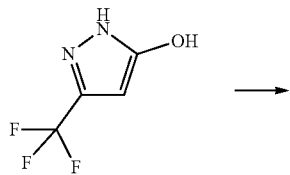

→

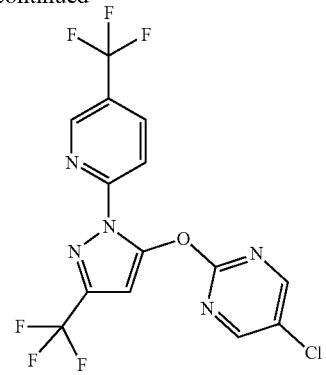

To a degassed suspension of 3-(trifluoromethyl)-1H-pyrazol-5-ol (0.15 g, 0.94 mmol), 1,10-phenanthroline (0.085 g, 0.47 mmol), copper (1) iodide (0.045 g, 0.23 mmol) and cesium carbonate (0.92 g, 2.81 mmol) in dimethylsulfoxide (4.00 mL) was added 2-bromo-5-(trifluoromethyl)pyridine (0.42 g, 1.85 mmol) and the reaction heated to 100° C. under N$_2$ overnight. The reaction was cooled to RT and a solution of 2,5-dichloropyrimidine (0.29 g, 1.85 mmol) in dimethylsulfoxide (2.5 mL) was added. The reaction was then heated to 80° C. under N$_2$ for 16 h. The reaction mixture was concentrated to dryness, diluted with water and extracted with ethyl acetate. The crude product was purified by mass-directed reverse phase HPLC to give the desired product (18 mg, 5%).

$^1$H NMR (400 MHz, CDCl$_3$) δ 8.47 (s, 2H), 8.36 (s, 1H), 8.03 (s, 2H), 6.53 (s, 1H)

TABLE 1

Examples of herbicidal compounds of the present invention.

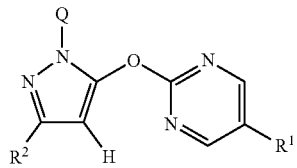

| Compound | Q | R$^1$ | R$^2$ | Data $^1$H NMR (400 MHz, CDCl$_3$ unless stated) |
|---|---|---|---|---|
| 1.001 | 4-CF$_3$-phenyl- | Cl | CF$_3$ | 8.54 (s, 2H), 7.87 (d, 2H), 7.74 (d, 2H), 6.65 (s, 1H) |
| 1.002 | 4-Cl-phenyl- | Cl | CF$_3$ | 8.52 (s, 2H), 7.63 (d, 2H), 7.41 (d, 2H), 6.60 (s, 1H) |
| 1.003 | 3-CF$_3$-phenyl- | Cl | CF$_3$ | 8.53 (s, 2H), 7.99 (s, 1H), 7.91 (d, 1H), 7.67-7.55 (m, 2H), 6.64 (s, 1H) |
| 1.004 | 3-Cl-phenyl- | Cl | CF$_3$ | 8.53 (s, 2H), 7.73 (s, 1H), 7.60 (d, 1H), 7.40-7.32 (m, 2H), 6.60 (s, 1H) |
| 1.005 | 4-CF$_3$-phenyl- | Cl | CF$_2$H | 8.53 (s, 2H), 7.86 (d, 2H), 7.71 (d, 2H), 6.84-6.57 (t, 1H), 6.60 (s, 1H) |
| 1.006 | 4-Cl-phenyl- | Cl | CF$_2$H | |
| 1.007 | 3-CF$_3$-phenyl- | Cl | CF$_2$H | |
| 1.008 | 3-Cl-phenyl- | Cl | CF$_2$H | |
| 1.009 | 2-pyridine-4-CN | Cl | CF$_3$ | 8.46 (s, 2H), 8.27 (d, 1H), 8.16 (s, 1H), 7.37 (d, 1H), 6.53 (s, 1H) |
| 1.010 | 3-Cl-6-pyridazine | Cl | CF$_3$ | 8.46 (s, 2H), 8.11 (d, 1H), 7.65 (d, 1H), 6.57 (s, 1H) |
| 1.011 | 6-OMe-3-pyridazine | Cl | CF$_3$ | 8.47 (s, 2H), 7.92 (d, 1H), 7.09 (d, 1H), 6.54 (s, 1H), 4.02 (s, 3H) |
| 1.012 | 6-Me-3-pyridazine | Cl | CF$_3$ | 8.46 (s, 2H), 7.99 (d, 1H), 7.48 (d, 1H), 6.55 (s, 1H), 2.63 (s, 3H) |
| 1.013 | 3-pyridazine | Cl | CF$_3$ | 9.05 (br d, 1H), 8.49 (s, 2H), 8.15 (d, 1H), 7.65 (dd, 1H), 6.60 (s, 1H) |
| 1.014 | 6-OMe-2-pyrazine | Cl | CF$_3$ | 8.66 (s, 1H), 8.47 (s, 2H), 8.09 (s, 1H), 6.51 (s, 1H), 3.55 (s, 3H) |
| 1.015 | 2-pyrimidine | Cl | CF$_3$ | 8.60 (d, 2H), 8.46 (s, 2H), 7.21 (t, 1H), 6.54 (s, 1H) |
| 1.016 | 5-Cl-2-pyrimidine | Cl | CF$_3$ | 8.72 (s, 2H), 8.51 (s, 2H), 6.84 (s, 1H) |
| 1.017 | 5-Cl-2-pyrimidine | H | CF$_3$ | 8.57-8.51 (m, 4H), 7.14 (t, 1H), 6.56 (s, 1H) |
| 1.018 | 2-pyridine-5-CN | Cl | CF$_3$ | 8.46 (s, 2H), 8.37 (s, 1H), 8.06 (s, 2H), 6.53 (s, 1H) |
| 1.019 | 2-pyridine-5-CF$_3$ | Cl | CF$_3$ | 8.47 (s, 2H), 8.36 (s, 1H), 8.03 (s, 2H), 6.53 (s, 1H) |
| 1.020 | 4-CF$_3$-phenyl | Me | CF$_3$ | 8.41 (d, 2H), 7.90 (d, 2H), 7.71 (s, 2H), 6.64 (s, 1H), 2.30 (s, 3H) |
| 1.021 | 4-CF$_3$-phenyl | F | CF$_3$ | 8.46 (s, 2H), 7.89 (d, 2H), 7.72 (d, 2H), 6.66 (s, 1H) |
| 1.022 | 2-Me-5-pyrimidine | Cl | CF$_3$ | 9.01 (s, 2H), 8.56 (s, 2H), 6.70 (s, 1H), 2.80 (s, 3H) |

TABLE 1-continued

Examples of herbicidal compounds of the present invention.

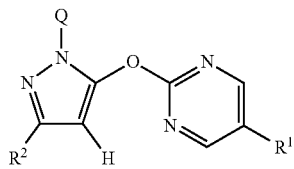

| Compound | Q | R¹ | R² | Data ¹H NMR (400 MHz, CDCl₃ unless stated) |
|---|---|---|---|---|
| 1.023 | 2-CF₃-4-pyrimidine | Cl | CF₃ | 8.94 (d, 1H), 8.50 (s, 2H), 8.14 (d, 1H), 6.58 (s, 1H) |
| 1.024 | 5-CF₃-2-pyrazine | Cl | CF₃ | 9.39 (d, 1H), 8.54 (s, 2H), 8.52 (s, 1H), 6.63 (s, 1H) |
| 1.025 | 5-CN-2-pyrazine | Cl | CF₃ | 9.42 (d, 1H), 8.52 (s, 2H), 8.47 (d, 1H), 6.62 (s, 1H) |
| 1.026 | 4-CF₃-phenyl | OCHF₂ | CF₃ | 8.48 (s, 2H), 7.89 (d, 2H), 7.73 (d, 2H), 6.67 (s, 1H), 6.58 (t, 1H) |
| 1.027 | 4-OMe-phenyl | Cl | CF₃ | 8.50 (s, 2H), 7.60-7.41 (m, 2H), 6.98-6.82 (m, (2H), 6.55 (s, 1H), 3.81 (s, 3H) |
| 1.028 | 4-OCHF₂-phenyl | Cl | CF₃ | 8.52 (s, 2H), 7.73-7.63 (m, 2H), 7.24-7.13 (m, 2H), 6.61 (s, 1H), 6.52 (t, 1H) |
| 1.029 | 4-Me-phenyl | Cl | CF₃ | 8.50 (s, 2H), 7.52 (d, 2H), 7.23 (d, 2H), 6.57 (s, 1H), 2.37 (s, 3H) |
| 1.030 | 3-OCHF₂-phenyl | Cl | CF₃ | 8.53 (s, 2H), 7.56 (ddd, 1H), 7.49 (t, 1H), 7.44 (t, 1H), 7.13 (dd, 1H), 6.61 (s, 1H), 6.54 (t, 1H) |
| 1.031 | 3-SO₂Me-phenyl | Cl | CF₃ | 8.55 (s, 2H), 8.32 (t, 1H), 8.04 (ddd, 1H), 7.96 (qd, 1H), 7.69 (t, 1H), 6.68 (s, 1H), 3.10 (s, 3H) |
| 1.032 | 4-SO₂Me-phenyl | Cl | CF₃ | 8.55 (s, 2H), 8.05 (d, 2H), 7.99 (d, 2H), 6.68 (s, 1H), 3.08 (s, 3H) |
| 1.033 | 2-F-phenyl | Cl | CF₃ | 8.54 (s, 2H), 7.55 (dt, 1H), 7.49-7.36 (m, 1H), 7.29-7.15 (m, 2H), 6.66 (s, 1H) |
| 1.034 | 2-Me-phenyl | Cl | CF₃ | 8.48 (s, 2H), 7.38-7.27 (m, 3H), 7.26-7.18 (m, 1H), 6.56 (s, 1H), 2.20 (s, 3H) |
| 1.035 | 4-CN-phenyl | Cl | CF₃ | 8.55 (s, 2H), 7.92 (d, 2H), 7.76 (d, 2H), 6.68 (s, 1H) |
| 1.036 | 4-CF₃-phenyl | Br | CF₃ | 8.62 (s, 2H), 7.87 (d, 2H), 7.72 (d, 2H), 6.65 (s, 1H) |
| 1.037 | 2-CF₃-5-pyridine | Cl | CF₃ | 9.18 (d, 1H), 8.57 (s, 2H), 8.31 (dd, 1H), 7.82 (d, 1H), 6.73 (s, 1H) |
| 1.038 | 2-Cl-5-pyridine | Cl | CF₃ | 8.80 (d, 1H), 8.56 (s, 2H), 8.05 (dd, 1H), 7.45 (d, 1H), 6.68 (s, 1H) |
| 1.039 | 2-Cl-4-pyridine | Cl | CF₃ | 8.59 (s, 2H), 8.47 (d, 1H), 7.89 (d, 1H), 7.76 (dd, 1H), 6.71 (s, 1H) |
| 1.040 | 2-CF₃-4-pyridine | Cl | CF₃ | 8.82 (d, 1H), 8.59 (s, 2H), 8.25 (d, 1H), 8.03 (dd, 1H), 6.76 (s, 1H) |

BIOLOGICAL EXAMPLES

Seeds of a variety of test species are sown in standard soil in pots Amaranthus retoflexus (AMARE), Abutilon theophrasti (ABUTH), Setaria faberi (SETFA), Echinochloa crus-galli (ECHCG), Ipomoea hederacea (IPOHE)). After cultivation for one day (pre-emergence) or after 8 days cultivation (post-emergence) under controlled conditions in a glasshouse (at 24/16° C., day/night; 14 hours light; 65% humidity), the plants are sprayed with an aqueous spray solution derived from the formulation of the technical active ingredient in acetone/water (50:50) solution containing 0.5% Tween 20 (polyoxyethelyene sorbitan monolaurate, CAS RN 9005-64-5). Compounds are applied at 250 g/ha unless otherwise stated. The test plants are then grown in a glasshouse under controlled conditions in a glasshouse (at 24/16° C., day/night; 14 hours light; 65% humidity) and watered twice daily. After 13 days for pre and post-emergence, the test is evaluated for the percentage damage caused to the plant. The biological activities are shown in the following table on a five-point scale (5=81-100%; 4=61-80%; 3=41-60%; 2=21-40%; 1=0-20%).

TABLE B1

Post-emergence Test

| Compound | Rate (g/ha) | AMARE | ABUTH | SETFA | ECHCG | IPOHE |
|---|---|---|---|---|---|---|
| 1.001 | 250 | 5 | 5 | 5 | 5 | NT |
| 1.002 | 250 | 5 | 3 | 5 | 5 | 4 |
| 1.003 | 250 | 5 | 1 | 3 | 1 | 2 |
| 1.004 | 250 | 5 | 1 | 3 | 3 | 4 |
| 1.005 | 250 | 5 | 3 | 2 | 1 | 2 |
| 1.012 | 250 | 2 | 1 | 1 | 1 | 1 |
| 1.020 | 250 | 5 | NT | 4 | 4 | 3 |
| 1.021 | 250 | 4 | NT | 4 | 5 | 4 |
| 1.022 | 250 | 5 | NT | 4 | 4 | 1 |
| 1.028 | 250 | 4 | NT | 2 | 2 | 1 |
| 1.029 | 250 | 4 | NT | 2 | 2 | 2 |
| 1.033 | 250 | 3 | NT | 1 | 1 | 1 |
| 1.036 | 250 | 4 | NT | 1 | 1 | 2 |

TABLE B2

Pre-emergence Test

| Compound | Rate (g/ha) | AMARE | ABUTH | SETFA | ECHCG | IPOHE |
|---|---|---|---|---|---|---|
| 1.001 | 250 | 5 | 4 | 5 | 5 | 5 |
| 1.002 | 250 | 5 | 2 | 5 | 5 | 1 |
| 1.003 | 250 | 5 | 1 | 5 | 2 | 1 |
| 1.004 | 250 | 5 | 1 | 3 | 2 | 1 |
| 1.005 | 250 | 4 | 1 | 2 | 1 | 1 |
| 1.012 | 250 | 3 | 1 | 1 | 1 | 1 |
| 1.020 | 250 | 5 | NT | 5 | 5 | 1 |
| 1.021 | 250 | 5 | NT | 5 | 5 | 2 |
| 1.022 | 250 | 5 | NT | 5 | 4 | 1 |
| 1.028 | 250 | 2 | NT | 2 | 1 | 1 |
| 1.029 | 250 | 3 | NT | 4 | 4 | 1 |
| 1.033 | 250 | 2 | NT | 1 | 1 | 1 |
| 1.036 | 250 | 3 | NT | 4 | 4 | 1 |

NT = Not tested

TABLE B3

Comparative Test
A comparative test is conducted to compare pyrazole compounds having methyl in the $R^2$ position, similar to those disclosed in CN105037342, with those of the present invention featuring $C_1$-$C_2$ haloalkyl in the $R^2$ position. The following comparator compounds C1 and C2 are utilised:

| Compound | Q | $R^1$ | $R^2$ |
|---|---|---|---|
| C1 | 4-$CF_3$-phenyl | Cl | $CH_3$ |
| C2 | 4-Cl-phenyl | Cl | $CH_3$ |

The results obtained are as follows:
Pre-Emergence

| Compound | Rate (g/ha) | AMARE | LABUTH | SETFA | ECHCG | IPOHE |
|---|---|---|---|---|---|---|
| 1.001 | 250 | 5 | 4 | 5 | 5 | 5 |
| C1 | 250 | — | 1 | 2 | 1 | 1 |
| 1.002 | 250 | 5 | 2 | 5 | 5 | 1 |
| C2 | 250 | 1 | 1 | 1 | 1 | 1 |

Post-Emergence

| Compound | Rate (g/ha) | AMARE | ABUTH | SETFA | ECHCG | IPOHE |
|---|---|---|---|---|---|---|
| 1.001 | 250 | 5 | 5 | 5 | 5 | — |
| C1 | 250 | 4 | 2 | 2 | 1 | 1 |
| 1.002 | 250 | 5 | 3 | 5 | 5 | 4 |
| C2 | 250 | 3 | 1 | 2 | 2 | 1 |

This comparative data clearly shows that the compounds of the present invention featuring $C_1$-$C_2$ haloalkyl in the $R^2$ position, represented by 1.001 and 1.002, exhibit significantly better control of a variety of weed species compared to compounds having a methyl in the $R^2$ position.

The invention claimed is:
1. A compound of Formula (I):

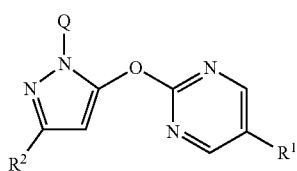

(I)

or an agronomically acceptable salt thereof,
wherein
Q is phenyl or a C-linked 6-membered heteroaryl wherein said phenyl or 6-membered heteroaryl is optionally substituted by one or more $R^3$;
$R^1$ is selected from the group consisting of halogen, —CN, $NO_2$, $C_1$-$C_4$alkyl, $C_1$-$C_4$haloalkyl, $C_3$-$C_6$cycloalkyl, $C_2$-$C_4$alkenyl, $C_2$-$C_4$alkynyl, —S(O)$_p$$C_1$-$C_4$alkyl, $C_1$-$C_4$alkoxy, —C(O) $C_1$-$C_4$alkyl, —C(O) O$C_1$-$C_4$alkyl and $C_1$-$C_4$haloalkoxy;
$R^2$ is C-$C_2$haloalkyl;
$R^3$ is selected from the group consisting of halogen, $C_1$-$C_4$ alkyl, $C_1$-$C_4$ haloalkyl, $C_1$-$C_4$ alkoxy, $C_1$-$C_4$ haloalkoxy, —CN, $NO_2$, $C_2$-$C_4$alkenyl, $C_2$-$C_4$alkynyl, —S(O)$_p$$C_1$-$C_4$alkyl; and
p=0, 1 or 2.

2. A compound of Formula (I) according to claim 1, wherein Q is selected from the group consisting of:

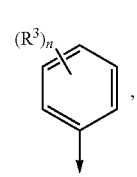

Q-1

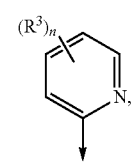

Q-2

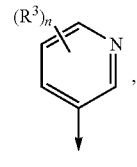

Q-3

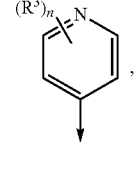

Q-4

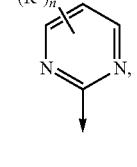

Q-5

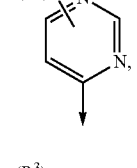

Q-6

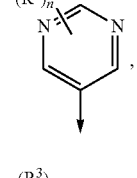

Q-7

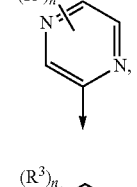

Q-8

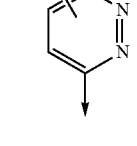 and

Q-10

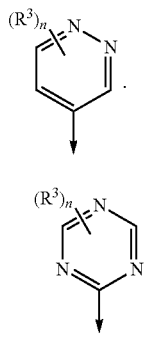

Q-11 wherein n is 0, 1 or 2.

3. A compound according to claim 2, wherein Q is Q1.

4. A compound according to claim 3, wherein n is 1.

5. A compound according to claim 4, wherein $R^3$ is halogen or —$CF_3$.

6. A compound according to claim 5, wherein Q is 4-Cl-phenyl-.

7. A compound according to claim 6, wherein $R^1$ is selected from the group consisting of halogen, CN, $C_1$-$C_4$alkyl, $C_1$-$C_4$haloalkyl, $C_1$-$C_4$alkoxy and $C_1$-$C_4$haloalkoxy.

8. A compound according to claim 7, wherein $R^1$ is halogen.

9. A compound according to claim 8, wherein $R^1$ is chloro.

10. A compound according to claim 9, wherein $R^2$ is —$CF_3$ or —$CF_2H$.

11. A herbicidal composition comprising a compound according to claim 1, and an agriculturally acceptable formulation adjuvant.

12. A herbicidal composition according to claim 11, further comprising at least one additional pesticide.

13. A herbicidal composition according to claim 12, wherein the additional pesticide is a herbicide or herbicide safener.

14. A method of controlling weeds at a locus comprising application to the locus of a weed controlling amount of a composition according to claim 11.

15. The compound according to claim 1, selected from:
5-chloro-2-[5-(trifluoromethyl)-2-[4-(trifluoromethyl) phenyl] pyrazol-3-yl]oxy-pyrimidine;
5-chloro-2-[2-(2-methylpyrimidin-5-yl)-5-(trifluoromethyl) pyrazol-3-yl]oxy-pyrimidine;
4-[5-(5-chloropyrimidin-2-yl)oxy-3-(trifluoromethyl) pyrazol-1-yl]-2-(trifluoromethyl)pyr imidine;
5-bromo-2-[5-(trifluoromethyl)-2-[4-(trifluoromethyl) phen yl] pyrazol-3-yl]oxy-pyrimidine;
5-methyl-2-[5-(trifluoromethyl)-2-[4-(trifluoromethyl) phen yl] pyrazol-3-yl]oxy-pyrimidine; and
5-chloro-2-[5-(trifluoromethyl)-2-[5-(trifluoromethyl)-2-pyridyl] pyrazol-3-yl]oxy-pyrimidine.

16. The compound according to claim 1, selected from the following table:

(I)

| Compound | Q | $R^1$ | $R^2$ |
|---|---|---|---|
| 1.001 | 4-$CF_3$-phenyl- | Cl | $CF_3$ |
| 1.002 | 4-Cl-phenyl- | Cl | $CF_3$ |
| 1.003 | 3-$CF_3$-phenyl- | Cl | $CF_3$ |
| 1.004 | 3-Cl-phenyl- | Cl | $CF_3$ |
| 1.005 | 4-$CF_3$-phenyl- | Cl | $CF_2H$ |
| 1.006 | 4-Cl-phenyl- | Cl | $CF_2H$ |
| 1.007 | 3-$CF_3$-phenyl- | Cl | $CF_2H$ |
| 1.008 | 3-Cl-phenyl- | Cl | $CF_2H$ |
| 1.009 | 2-pyridine-4-CN | Cl | $CF_3$ |
| 1.010 | 3-Cl-6-pyridazine | Cl | $CF_3$ |
| 1.011 | 6-OMe-3-pyridazine | Cl | $CF_3$ |
| 1.012 | 6-Me-3-pyridazine | Cl | $CF_3$ |
| 1.013 | 3-pyridazine | Cl | $CF_3$ |
| 1.014 | 6-OMe-2-pyrazine | Cl | $CF_3$ |
| 1.015 | 2-pyrimidine | Cl | $CF_3$ |
| 1.016 | 5-Cl-2-pyrimidine | Cl | $CF_3$ |
| 1.017 | 5-Cl-2-pyrimidine | H | $CF_3$ |
| 1.018 | 2-pyridine-5-CN | Cl | $CF_3$ |
| 1.019 | 2-pyridine-5-$CF_3$ | Cl | $CF_3$ |
| 1.020 | 4-$CF_3$-phenyl | Me | $CF_3$ |
| 1.021 | 4-$CF_3$-phenyl | F | $CF_3$ |
| 1.022 | 2-Me-5-pyrimidine | Cl | $CF_3$ |
| 1.023 | 2-$CF_3$-4-pyrimidine | Cl | $CF_3$ |
| 1.024 | 5-$CF_3$-2-pyrazine | Cl | $CF_3$ |
| 1.025 | 5-CN-2-pyrazine | Cl | $CF_3$ |
| 1.026 | 4-$CF_3$-phenyl | $OCHF_2$ | $CF_3$ |
| 1.027 | 4-OMe-phenyl | Cl | $CF_3$ |
| 1.028 | 4-$OCHF_2$-phenyl | Cl | $CF_3$ |
| 1.029 | 4-Me-phenyl | Cl | $CF_3$ |
| 1.030 | 3-$OCHF_2$-phenyl | Cl | $CF_3$ |
| 1.031 | 3-$SO_2$Me-phenyl | Cl | $CF_3$ |
| 1.032 | 4-$SO_2$Me-phenyl | Cl | $CF_3$ |
| 1.033 | 2-F-phenyl | Cl | $CF_3$ |
| 1.034 | 2-Me-phenyl | Cl | $CF_3$ |
| 1.035 | 4-CN-phenyl | Cl | $CF_3$ |
| 1.036 | 4-$CF_3$-phenyl | Br | $CF_3$ |
| 1.037 | 2-$CF_3$-5-pyridine | Cl | $CF_3$ |
| 1.038 | 2-Cl-5-pyridine | Cl | $CF_3$ |
| 1.039 | 2-Cl-4-pyridine | Cl | $CF_3$ |
| 1.040 | 2-$CF_3$-4-pyridine. | Cl | $CF_3$ |

17. A herbicidal composition comprising the compound according to claim 16, and an agriculturally acceptable formulation adjuvant.

18. A method of controlling weeds at a locus comprising application to the locus of a weed controlling amount of the compound according to claim 17.

* * * * *